United States Patent [19]

Dingess

[11] Patent Number: 4,854,274
[45] Date of Patent: Aug. 8, 1989

[54] POWER BOOSTER INTERNAL COMBUSTION ENGINE FLYWHEEL

[76] Inventor: Billy E. Dingess, 117 Railroad Ave., Ferrellsburg, W. Va. 25513

[21] Appl. No.: 161,111

[22] Filed: Feb. 25, 1988

[51] Int. Cl.$^4$ .......................... F16D 3/10; F16D 3/80; F02B 75/06
[52] U.S. Cl. ............................ 123/192 R; 123/53 A; 74/574; 464/2; 192/42
[58] Field of Search .............. 123/53 R, 53 A, 192 R; 74/572, 574, 603, 604; 192/41 R, 41 A, 42; 464/2, 28, 160, 161

[56] References Cited

U.S. PATENT DOCUMENTS

| | | | |
|---|---|---|---|
| 3,200,799 | 8/1965 | Hammick | 123/53 A |
| 3,837,182 | 9/1974 | Kulhavy | 74/574 X |
| 3,865,219 | 2/1975 | Dossier | 192/41 R X |
| 4,307,687 | 12/1981 | Holstein | 123/53 A X |
| 4,338,892 | 7/1982 | Harshberger | 123/53 A X |
| 4,497,393 | 2/1985 | Brems | 74/574 X |
| 4,617,884 | 10/1986 | Allen et al. | 123/192 R |
| 4,744,782 | 5/1988 | Wallace et al. | 464/160 X |

Primary Examiner—Willis R. Wolfe

[57] ABSTRACT

Due to the present energy problems there is a need for a more efficient internal combustion engine. Herein is disclosed a means of making the engine more efficient through use of a flywheel apparatus. The flywheel provides a means of allowing the crankshaft of the engine to be rapidly advanced to that of the flywheel on the power strokes which will transfer the heat produced to rotatable power before the heat can be lost into the engine block. The flywheel further comprises the means of rapidly retarding the crankshaft on the compression strokes so that in the high speed cycle its speed would equal 5000 RPM, while the slow cycle is 1000 RPM, with the total RPM being 3000 RPM or midway between the slow and high speed cycles. A cam conected to a flywheel shaft drives cam action rods housed within the flywheel housing outward against nitrogen charged bladders on the power strokes building up potential energy within the bladder and is used to slow the rotational motion on non power strokes of the engine. A freewheeling-flywheel is provided that rotates at the highest rotational motion of the crankshaft connected to the first flywheel and as the crankshaft is advanced so will the freewheeling-flywheel but in the slow motion of the crankshaft the potential energy from the freewheeling-flywheel will drive the device such as a automobile until the next power stroke of the engine.

15 Claims, 8 Drawing Sheets

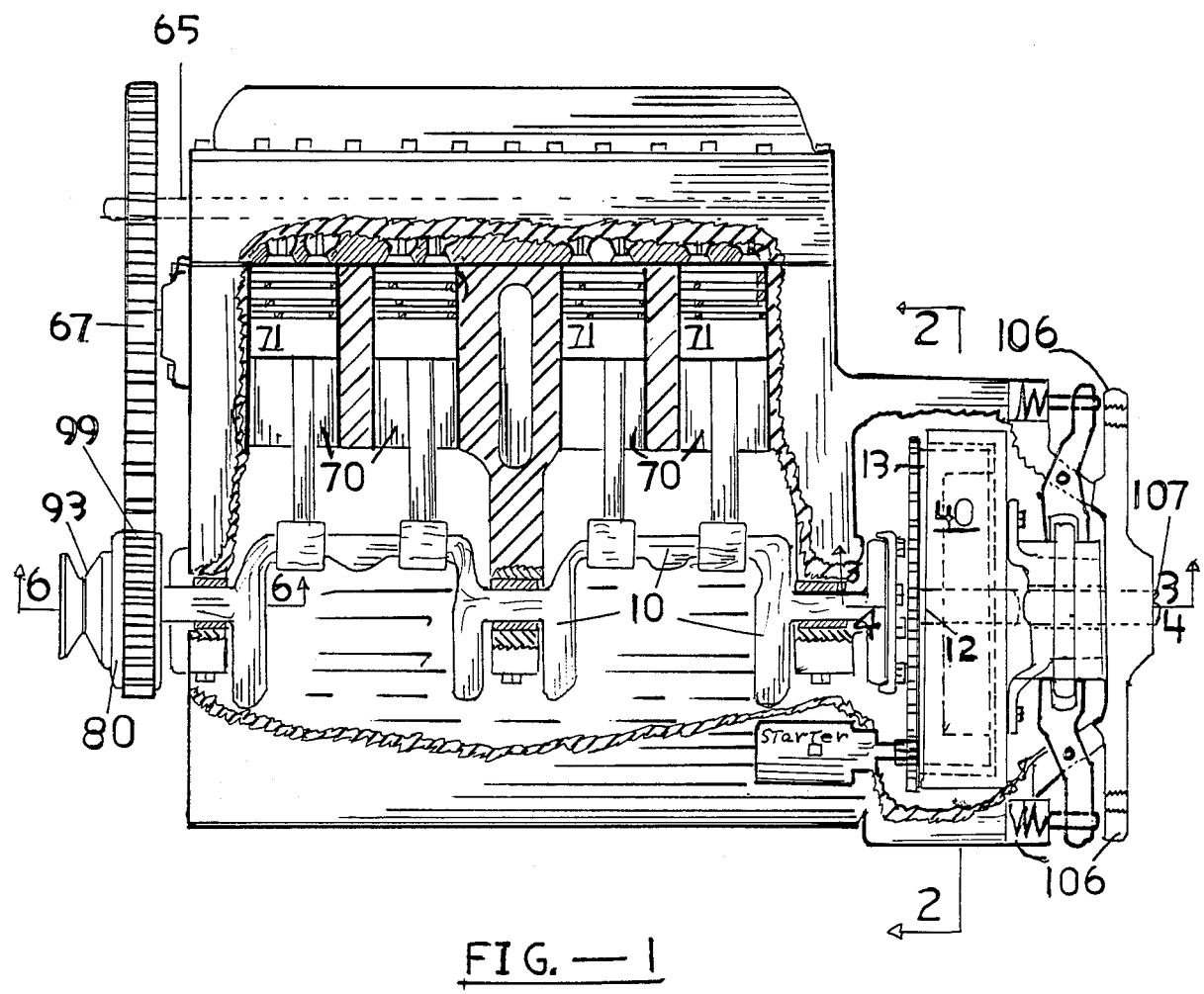
FIG.—1

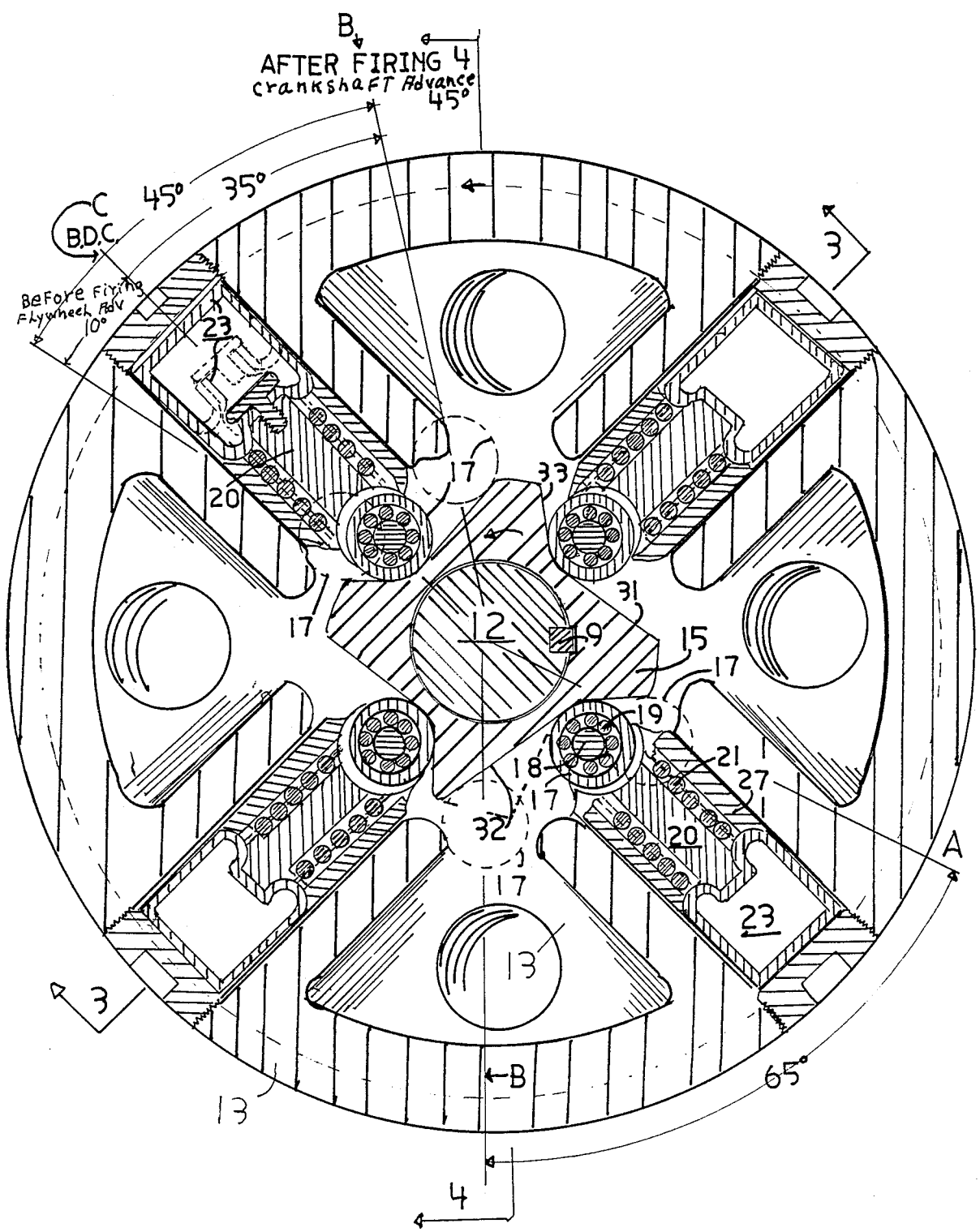
FIG.—2

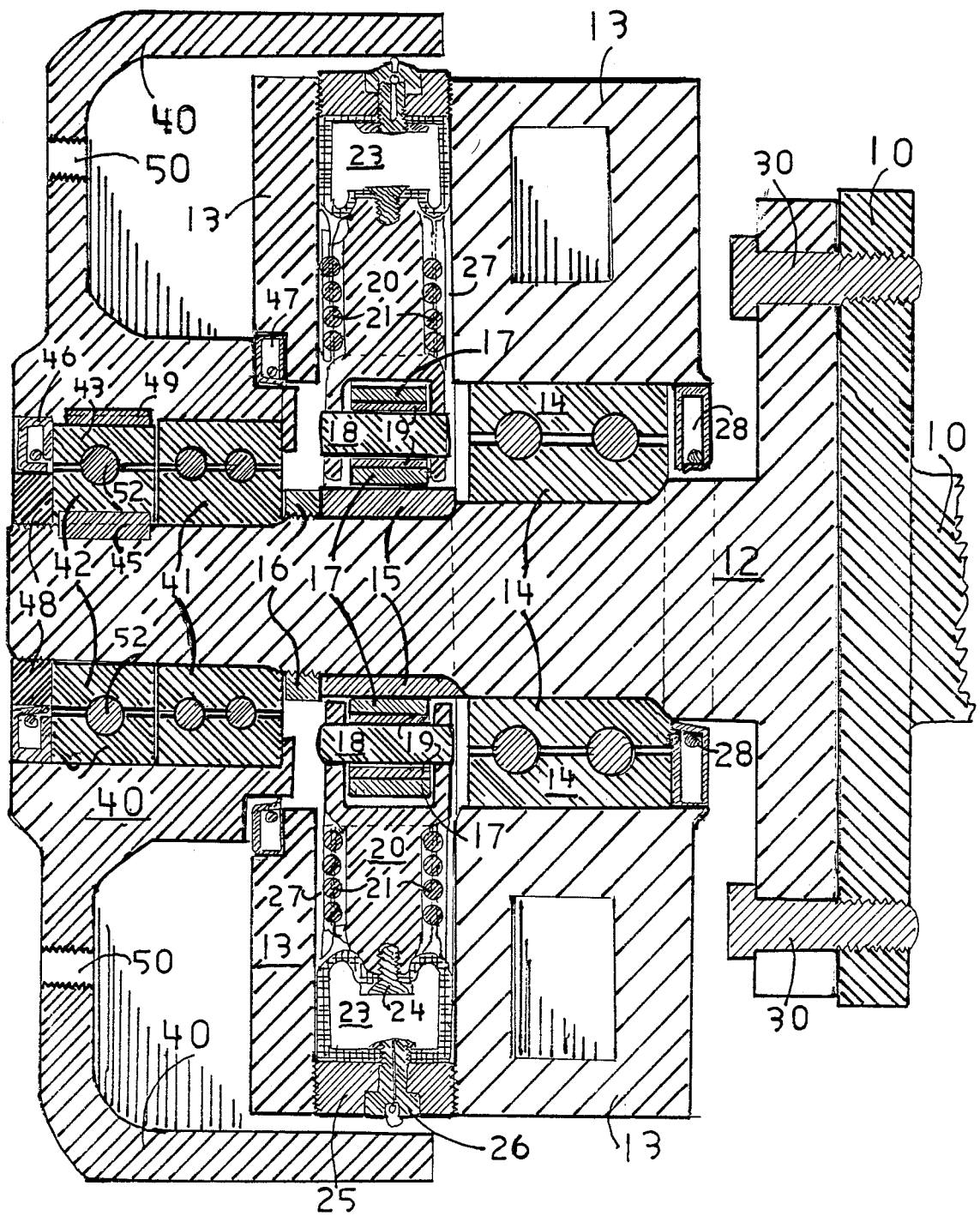
FIG.—3

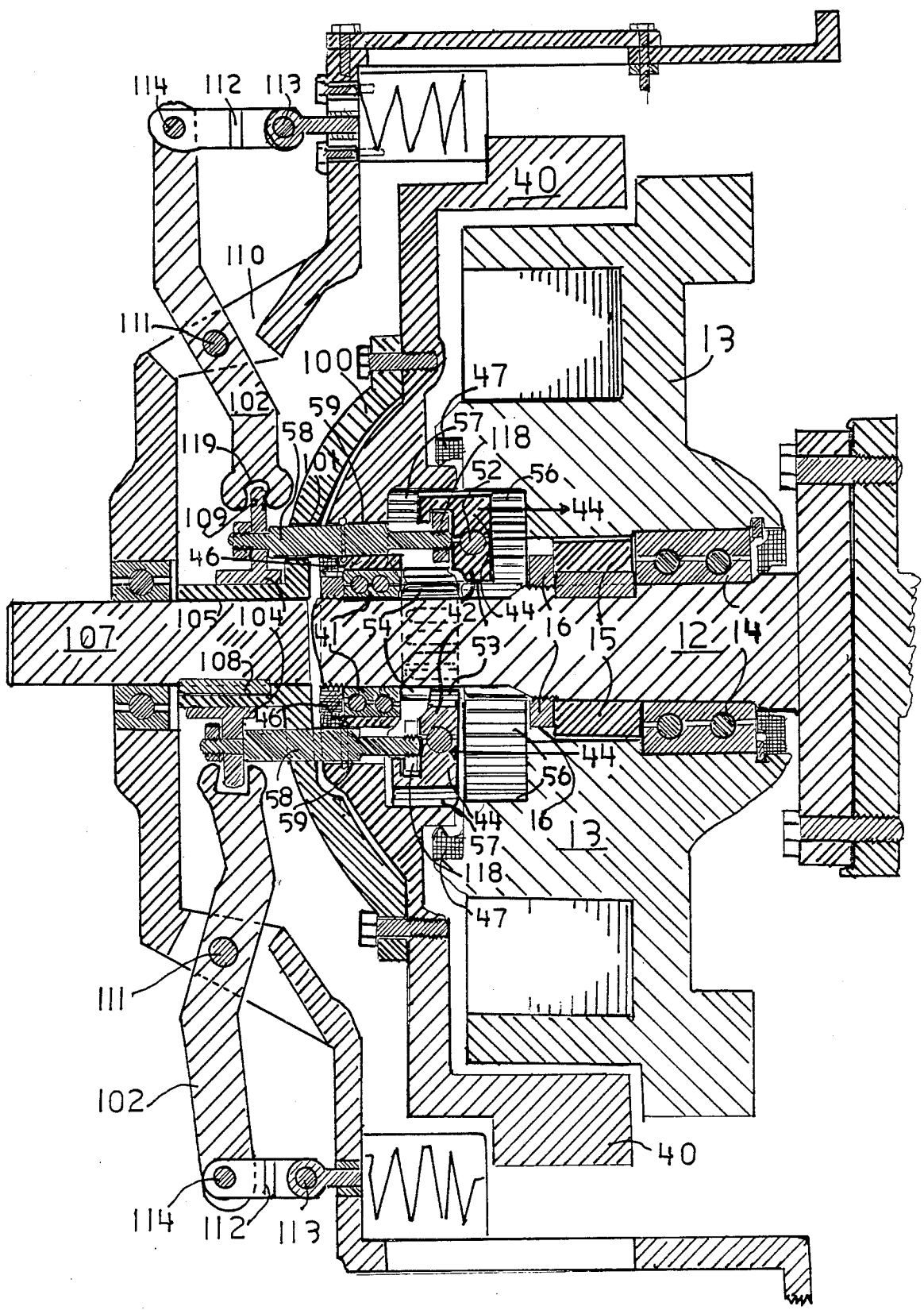
FIG—4

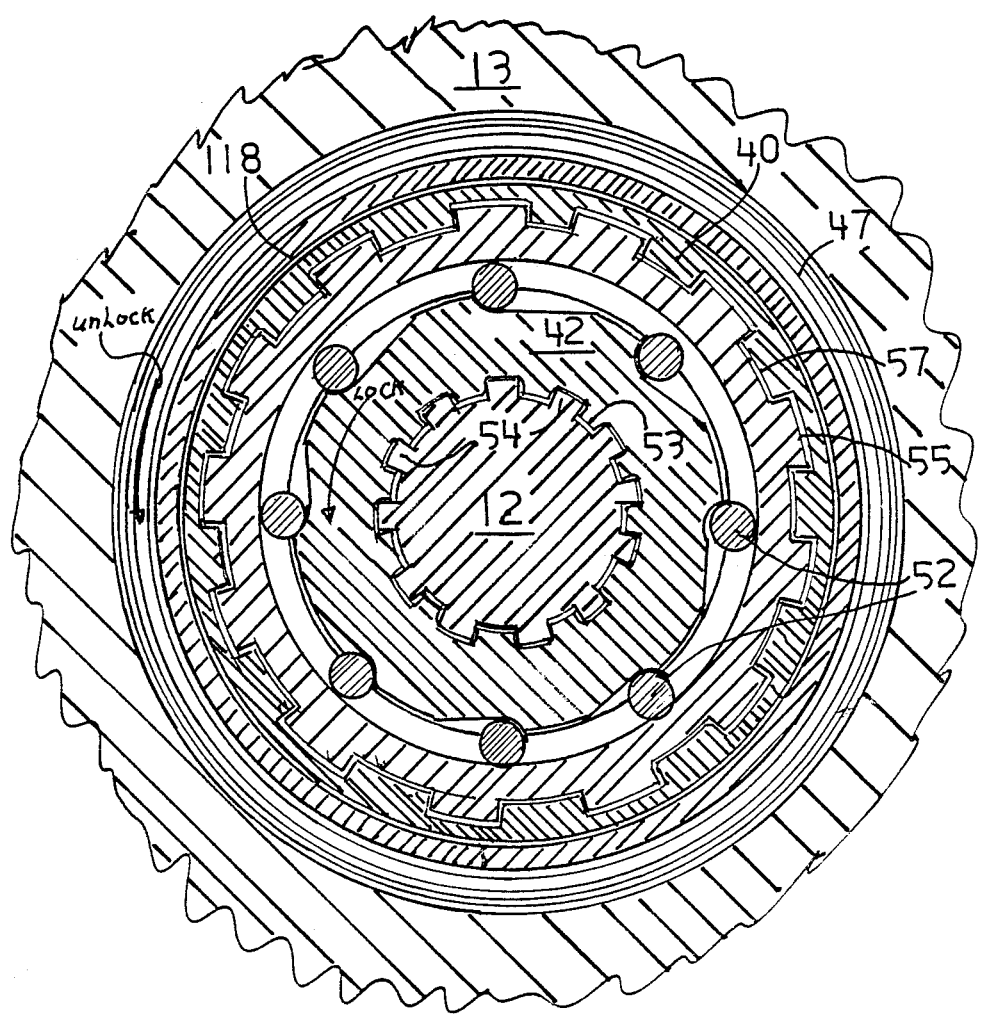
FIG.—5

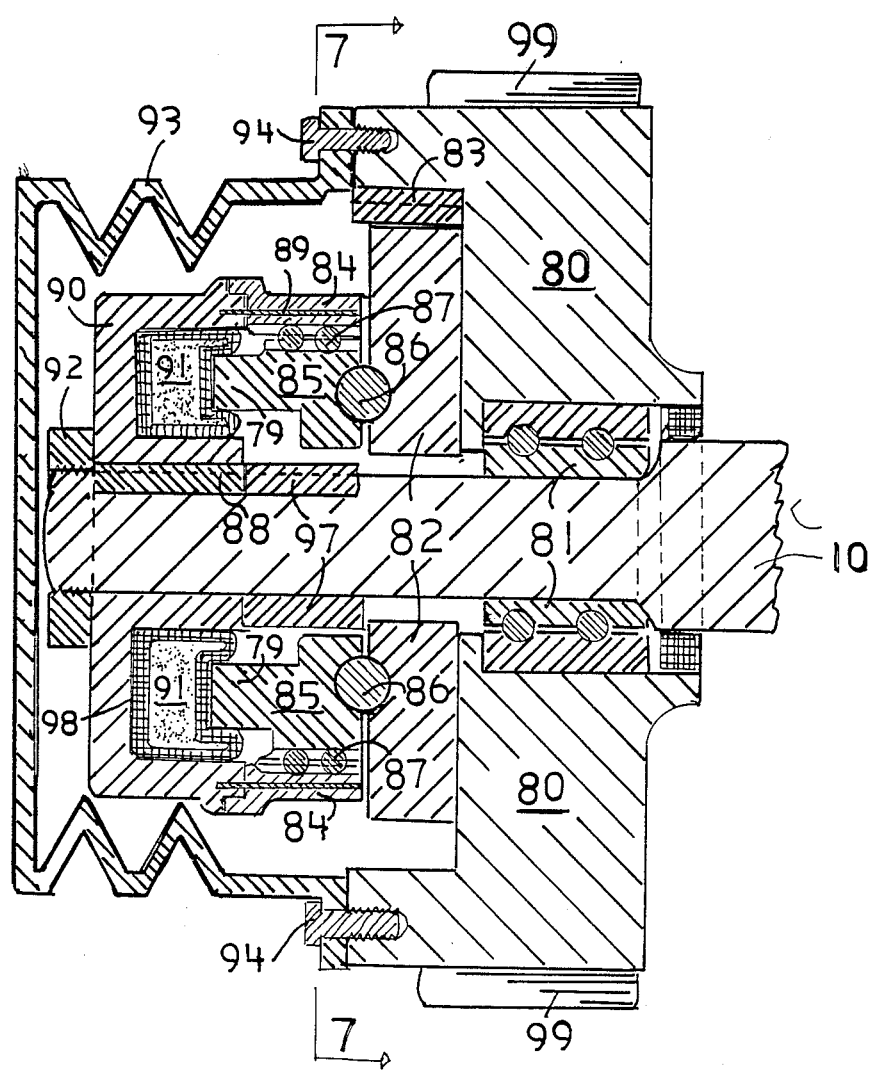
FIG.—6

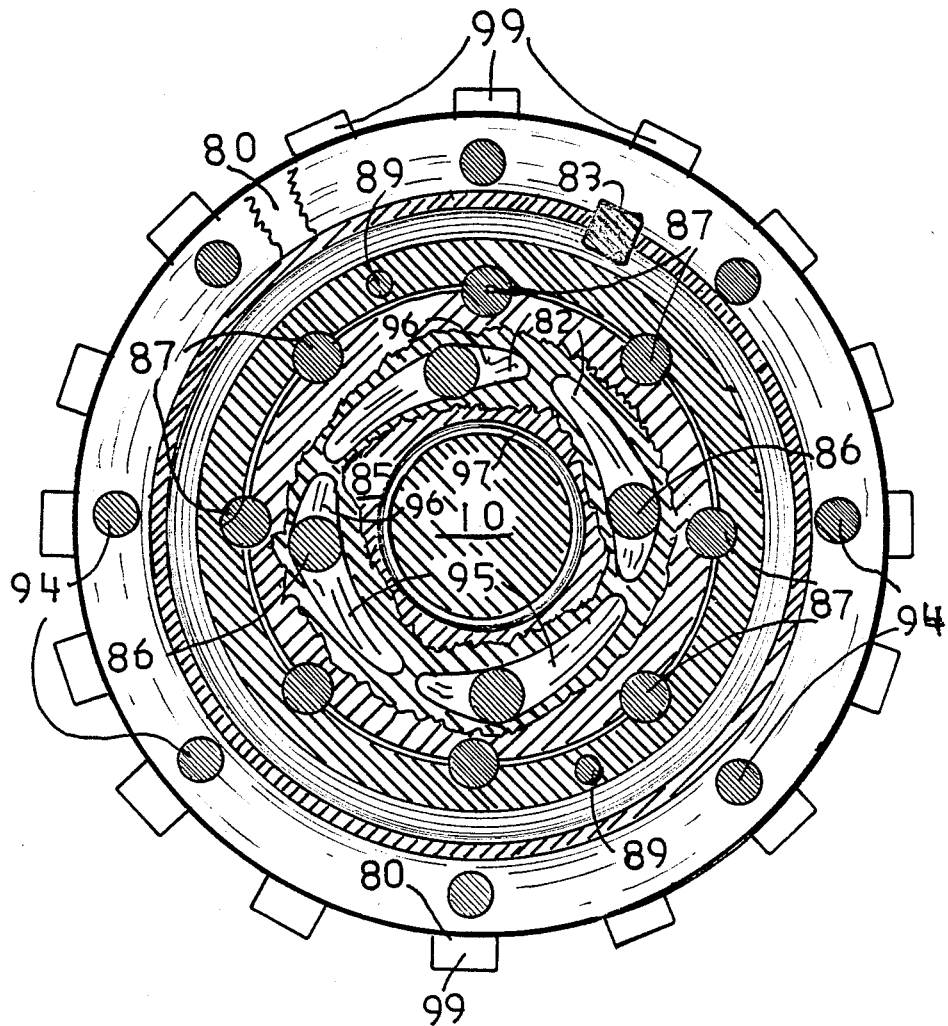
FIG.—7

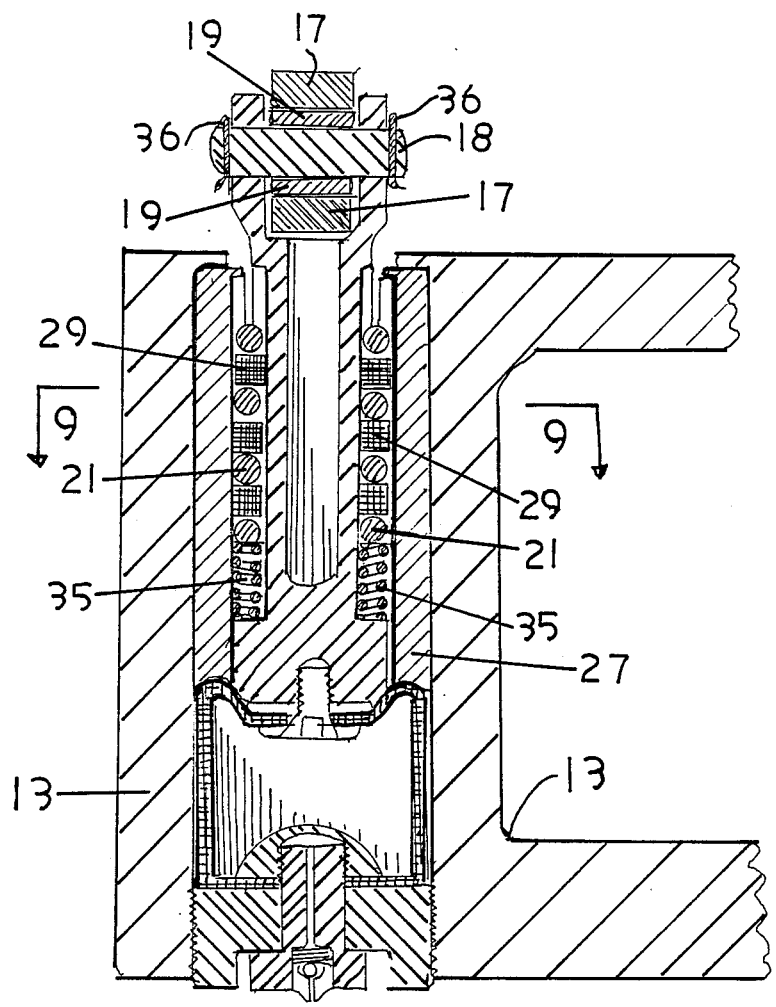
FIG.—8
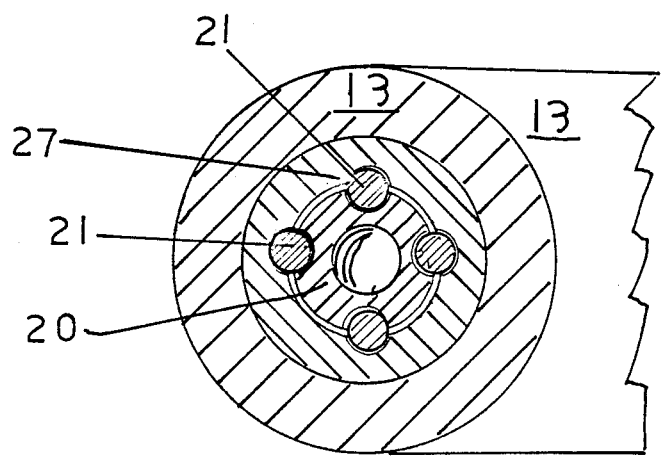
FIG.—9

POWER BOOSTER INTERNAL COMBUSTION ENGINE FLYWHEEL

Prior Art

Conventional internal combustion engine flywheels are one-piece construction and normally bolted to the rear of the engine crankshaft. They provide a means of starting the engine and their heavy weight smoothes out the revolution of the engine, eliminating vibration.

When combustion takes place within the engine, the flywheel holds back the action from the pistons rather than allowing rapid speed of the pistons on the power stroke. This causes a rapid heat transfer to the engine block, especially at low rpm of the engine rather than rapidly drive the piston from the combustion and transfer the heat to rotatable motion.

Conventional engines are also timed to fire one piston at a time thus providing a more uniform power stroke action as 1-5-3-6-2-4 in a 6-cylinder.

In this invention, it is suggested that two or more cylinders by on the power stroke at a time to provide 360 degrees for the flywheel, allowing the rapid motion of the pistons on the power stroke and the slowing down motion of the pistons on the exhaust stroke and compression stroke. However, this invention can produce positive results in power and the saving of fuel when the rapid and slow motion takes place within 180 degrees.

BRIEF SUMMARY OF INVENTION

In piston type internal combustion engines, heat is produced by combustion of air and gas mixtures to equal as much as 4500 degrees farenheit. In conventional engines, the heat is transferred rapidly to the engine block and this heat loss is undesirable. When the pistons are top dead center or before combustion takes place, at which time the speed of the piston is at its slowest movement, the highest speed being at 90 degrees after top dead center of the power stroke this 0 to 90 degrees is where heat loss affects the loss of power and/or pressure the most.

In this invention, the piston will move at its highest speed beginning within 15 degrees after top dead center or combustion lasting throughout the power stroke or until the exhaust valve begins to open after top dead center, where the piston is slowed down by potential energy produced by the flywheel of the engine. To do this, the crankshaft is lightened and possible use titanium or high strength aluminum alloys with a steel alloy bearing surface dowelled to aluminum crankshaft, but this invention relates more to the flywheel and the camshaft drive pully. The flywheel and camshaft drive pully are to allow as much as 65 degree advancement and as much as 10 degree retardment in relationship to the crankshaft. The advancement of the crankshaft taken place by the force of combustion on the pistons driving the light weight crankshaft against a heavy flywheel and the retardment taken place as the flywheel begins to drive the crankshaft against the compression strokes of the engine.

The flywheel provides a means of allowing the crankshaft to be advance through a cam action and nitrogen charged bladders. A cam action rod is driven outward at the beginning of the power stroke thus speeding up the piston movement and driven inward by the pressurized bladders slowing down the piston movement.

A second flywheel is provided that is driven to the highest rotatable speed of the crankshaft and is freewheeling at the lowest speed of the crankshaft, thus this invention provides a means of transferring the heat produced from combustion of an internal combustion engine into rotatable power equal to high rpm at very low rpm, thus providing a more efficient engine through the use of this invention.

This invention will be better understood when studied in conjunction with the drawings and written descriptions of which;

BRIEF DESCRIPTION OF DRAWINGS

FIG. 1 is side view of a internal combustion engine showing front end rear flywheels.

FIG. 2 is a sectional view of flywheel taken at line 2—2 of FIG. 1.

FIG. 3 is a sectional view of flywheel taken at line 3—3 of FIG. 1 but without a shifter apparatus.

FIG. 4 is a sectional view taken at line 4—4 of FIG. 1 that includes a shifter apparatus.

FIG. 5 is a sectional view of flywheel taken at line 5—5 of FIG. 4.

FIG. 6 is a sectional view of a front flywheel taken at line 6—6 of FIG. 1.

FIG. 7 is a sectional view of a front flywheel at line 7—7 FIG. 6.

FIG. 8 is a isolated view of the cam action rods of the first flywheel.

FIG. 9 is a sectional view of cam action rods taken at line 9—9 of FIG. 8.

DETAILED DESCRIPTION

A 4 cycle 4 cylinder engine is shown FIG. 1. The cam shaft 65 is modified to time the valves for 1 and 4 cylinders to be on the power stroke at the same time. As 1 and 4 pistons move down 2 and 3 will move up on the compression stroke and as 1 and 4 pistons are moved to be on the exhaust, 2 and 3 will be on the power stroke. 1 and 4 pistons will then move to the intake stroke while 2 and 3 are on the exhaust stroke. The 1 and 4 will then start the compression stroke while 2 and 3 begin the intake stroke. This will provide 360 degrees whereby the crankshaft is slowed down. On an 8-cylinder engine, 1 and 8 pistons should be fired on the power stroke and on the same rotational movement fire 2 and 7----3 and 4 and 5----6 in a continuous firing order which would require approximately 450 degrees of rotational motion through the high speed motion and 270 degrees whereby the engine or the crankshaft motion could be slowed down. Alternatively, the crankshaft could be modified to have all cylinders at top dead center at the same time with the first cycle 1 and 4 power with 2 and 3 on intake. Second cycle 1 and 4 exhaust with 2 and 3 compression. The third cycle 1 and 4 on intake and 2 and 3 on exhaust which would provide 180 degrees fast action and 180 degrees of slow action from the crankshaft and this would be the preferred embodiment where the crankshaft is advanced 65 degrees to that of the flywheel. It should provide a balanced rotational speed of the flywheel approximately midway between the high and low rotational speeds of the crankshaft.

In FIG. 3 is shown a Internal Combustion Engine Flywheel more particular, a first flywheel 13 and a second flywheel 40 connected to the engine crankshaft 10. FIG. 2 shows a sectional view of flywheel 13 taken at line 2—2 of FIG. 1.

As an engine piston 71 is moved upward on the compression stroke from the force of flywheel 13 driving crankshaft 10 through shaft 12, it will cause the flywheel 13 to be retared as much as 10 degrees in relationtionship to the crankshaft 10 caused by a cam 15 forcing pressure on a nitrogen filled bladder 23 through cam action rods 20. The rods 20 are housed in a lineal ball bearings 20 being housed in cylinders 8 formed in the flywheel 13. When engine piston 71 is fired on/or combustion takes place, the crankshaft 10 will be quickly advanced to as much as 45 degrees to that of flywheel 13 illustrated as point A being top dead center and point B being after combustion takes place and point C being the neutral point. A different cam angle is shown at the bottom of FIG. 2 where the crankshaft 10 could be advanced as much as 65 degrees in relationship to the flywheel and when combustion takes place.

This arrangement of flywheel 13 allows the pistons 71 of a internal combustion engine to be moved quickly when combustion takes place on the power stroke which will advance the crankshaft 10 as much as 65 degrees to that of flywheel 13. It would be expected for the high speed action of the piston driving the crankshaft to be forced to its maximum speed from 0 degrees or top dead to 15 degrees after top dead center or thereabout. The high speed action will force a second freewheeling flywheel 40 to equal the high speed action of crankshaft 10 and pressure from the power stroke will hold the high speed action until the exhaust valve begins to open or about 160 degrees to 175 degrees after top dead center.

A second flywheel 40 is provided that is driven by shaft 12 and is mounted to shaft 12 by way of a ball bearing 41 and a free-wheeling clutch bearing 42 and 44. When the speed action of the crankshaft 10 drives against the flywheel 40 the ball bearing 52 will lock race 42 and 44 thus driving flywheel 40 to equal the high speed action of crankshaft 10.

In the slow cycle of crankshaft 10, the flywheel 40 will free-wheel or spin until another high speed cycle forces its rotation again, thus providing a uniform speed for flywheel 40 for the use of driving an object such as a automobile.

By connection the flywheel 40 to an automobile transmission, the high speed action of the crankshaft will be limited at the start of motion but the high speed pulses will quickly force the flywheel 40 rpm to be in excess of the total rpm of the engine.

A shifter apparatus is provided as shown in FIG. 4 for flywheel 40 to disengauge with shaft 12 and engauge with flywheel 13 for the purpose of allowing full advancement of crankshaft 10 at low speeds and still have the advantage of free-wheeling flywheel 40 at high speeds. The free-wheeling inner race 42 is splined 53 for shaft 12 splines 54 and flywheel 13 is splined 56 to mesh with outer free-wheeling race 44 splines 55. Splines 57 of flywheel 40 are constantly meshed with outer race splined 55. A shifter ring 118 is provided for shifting free-wheeling inner outer race forward as shown at top of FIG. 4 and to the rear as shown at the bottom of FIG. 4. A plurality of shifter rods 58 pass through hole 59 of flywheel housing 40 and holes 101 of drive coupling 100 on lineal bearing surface 105 keyed by a key 108 to drive coupling 100, and rotates with flywheel 40, thus providing a means of shifting by shifter rods 102 anchored by pins 111 at anchor 110 which is cast with bell housing 106. A electric solenoid 116 is bolted to bell housing 106 and is linked by linkage 112 by way of pins 113 and 114. A spring (not shown but is well known to those skilled in the art) operates a shifter rod in one direction and the solenoid 116 pulls the shifter rod 102 in the opposite direction, the shifter ring 104 comprises a plurality of holes 103 for housing shifter rods 58 held by a plurality of nuts 120. The shifter ring 104 is also impregnated with graphite 109 for lubrication between shifter ring and shifter fork 119. The shifter ring 104 is cast from brass, thus a means is provided for driving flywheel 40 through flywheel 13 at low speeds and driving flywheel 40 through flywheel shaft at high speed. A torque converter and/or a transmission can be driven from shaft 107. It should be noted that for an automobile with the use of a torque converter. A low and high range (two speed) with a reverse gear would be all the transmission required for driving a conventional automobile where the shifter apparatus is used. The flywheel 13 is mounted to shaft 12 by way of a heavy duty ball bearing 14 while the cam 15 is keyed to shaft 12 by key 9.

Two cam angles are shown in FIG. 2 for the purpose of showing how advancement of the crankshaft can be varied by using a different angle on cam 15 indicated by angle 31 being 45 degrees and angle 32 being 65 degrees of advancement. The cam action rods 20 is driven by cam 15 by way of cam roller 17 which is housed in round roller bearings 19 and roller pins 18. Lineal bearing grooves can be machined to cam rod 20 or alternative use of a lineal bearing assembly having an inner and outer race 27 pressed into cylinder 8. The ball bearings 21 give a friction free movement for cam rod 26 which will move at very fast action. The flywheel 13 cylinders 8 should be a precision finish especially where the nitrogen filled bladder 23 is located. The cam action rod 20 assemble to include bearings 21 and bladder 23 can be installed through a plug 25 opening then install plug 25. A cap screw 26 with a gas valve for pressurizing bladder 23 can be tightened for holding bladder 23 tightly against plugh 25 then fill bladder to the desired pressure after installation takes place. A nut 16 is provided to thread against the cam 15 for holding assemble to shaft 12. Oil seals are provided, comprising of a front seal 28, an intermediate seal 47 and a rear seal 46. A nut is provided for holding flywheel 40 to shaft 12. A means is provided for mounting flywheel 13 by-way of bolts 30. A front flywheel 80 is provided but with less angle to the cam and without the free-wheeling flywheel 40 and is mounted to the front end of crankshaft 10 for the purpose of providing a more balanced rotational speed for the engine cam shaft 65. The flywheel 80 will allow the crankshaft to be advanced forward in the high speed action without advancing the cam shaft 65. The degrees of advancement of flywheel 80 to that of the crankshaft 10 would be determined by how the firing order of the engine is arranged. One example would be to modify the crankshaft (in a 4 cylinder engine) to provide all rods throws to be parallel and fire two cylinders the first revolution and two on the second revolution. In this method, the advancement of flywheel 80 would be the same as flywheel 13. Alternatively, the firing arrangement could fire all cylinders in the first revolution and retard the crankshaft on the second revolution. This method would allow very little advancement of flywheel 80 due to the degrees between firing on one revolution would require the flywheel to be advanced and retarded to the neutral position when each cylinder is top dead center of the compression stroke or within 90 degrees in a 4 cylinder engine and the degrees between each cylinder in an 8 cylinder.

A means is also provided for driving the cam shaft 65 through a gear belt 67 from the front end of the crankshaft 10 through the flywheel 80, having gear belt drive teeth 99 cast or machined thereinto. The flywheel 80 is mounted on ball bearings 81. A cam plate 82 is keyed to flywheel 80 by way of key 83. A second cam plate 85 is placed against ball bearing 86 between cam plate 82 and cam plate 85. A bearing groove 95 is machined to match in each of the cam plates 82 and 85. Cam plate 85 is mounted on lineal ball bearings 87. The cam plate 85 comprises a plurality of bearings grooves that form the inner race for bearings 87. An outer race 97 is dowelled 89 to housing 90 which forms a cylinder 98 for a nitrogen pressurized bladder 91 and housing 90 is keyed to crankshaft 10 by way of key 88. A piston-like ring 79 is formed to cam plate 85 that rests against bladder 91 and when the crankshaft 10 is rotated rapidly, it will drive cam plate 85 against flywheel 80, causing bearing 86 to force outward cam plate 85 against bladder 91 to advance crankshaft 10 forward of flywheel 80. The cam bearing grooves 95 are tapered 45 degrees or determined by the firing order and will allow a maximum of 40 degrees advancement between crankshaft 10 and flywheel 80. Likewise, cam plate bearing groove 96 is tapered to 10 degrees and will allow a maximum of 5 degrees retardment between crankshaft 10 and flywheel 80. As the crankshaft 10 movement is slowed, the bladder 91 will force the cam plates to center between bearing grooves 95 and 96 where the timing of the engine is to correspond at top dead center of the compression strokes, thus the flywheel 80 will provide a constant speed or thereabout when the crankshaft is operating at varying speeds throughout each revolution or each two revolutions. It should be noted that the degree of advancement can be varied by increasing or decreasing the pressure within bladder 91, thus a means is provided for driving the cam shaft of the engine when a rear flywheel 13 is used causing varying speed to the crankshaft at a more constant rpm. It should also be noted that while the rapid advancement of the crankshaft force the cam plate outward from the power strokes of the engine, the pressurized bladder will rapidly force the cam plate inward to balance the rotation of flywheel 80.

To make the invention, the parts could be cast from state of the art alloy steels and machined to proper tollerance. After machining, the parts could be assembled as shown in the drawings. A new engine crankshaft cast from titanium should be used and the connecting rods and pistons of the engine cast from aluminum alloys, thus making the heavy moving parts of the engine as light as possible. It would also be necessary to modify the cam shaft to provide a means of timing the valves to correspond with the previously described firing order and the crankshaft to comprise all rod throws parallel with each other.

A means for driving accessories and or a devise should be incorporated into flywheel so such as cam belt drive teeth (99), drive pulleys (93) and, such that is convenient which is bolted by bolts (94) or casted as a part of flywheel housing (80).

The parts could then be assembled as shown in the drawings and made reference to in the written descriptions.

IN OPERATION

By modifying a 4 cylinder internal combustion engine for the purpose of using the flywheels all pistons are at top dead center at the same time, two of which are on the power stroke.

As 1 and 4 pistons are projected on the power strokes the crankshaft of the engine will be advanced forward to that of the flywheel as much as 65 degrees which will force the cam action rods outward compressing the nitrogen charged bladders. As the exhaust valves of 1 and 4 cylinders began to open and pressure driving 1 and 4 pistons is removed, the bladders will begin to force the cam action rods to their natural position and as 2 and 3 pistons begin the compression stroke the flywheel will begin to drive against the crankshaft by way of the flywheel cam which will force the cam action rods outward to retard the crankshaft as much as 10 degrees to that of the flywheel. When 2 and 3 pistons are fired upon to be projected on their strokes the nitrogen charged bladders as well as combustion will rapidly drive the crankshaft to be advanced again to that of the flywheel. The pistons on the power strokes will rapidly force the crankshaft in rotation and the driving force will ride against the freewheeling flywheel within 15 degrees after combustion and continue to force the freewheeling flywheel in rotation throughout the power strokes to equal the highest rotational motion of the crankshaft.

As the exhaust valves began to open and pressure is removed from the pistons the crankshaft rotational speed is slowed down and the freewheeling flywheel continues to rotate at a constant speed until the power strokes again force it rotation to equal the highest rotational speed of the crankshaft, thus the first cycles will ride against the freewheeling flywheel under power from combustion and the slow cycles of the crankshaft will be driven by the first flywheel operating at the slower rotational speed to drive the crankshaft in rotation during the exhaust and compression strokes of the engine. This method engine provides a fast and slow cycle each 360 degrees of rotation.

It should be understood that while a 4 cylinder engine is shown to be the preferred embodiment of the manner of arrangement of firing order of the engine the invention is not limited to such order as was described earlier. An example would be that in a V8 engine all cylinders would be fired in the first revolution and use the second revolution to slow the motion of the crankshaft.

Since many possible embodiments may be made of the invention, it should be understood that the invention is illustrative in nature and not in a limiting since.

What is claimed as my invention is:

1. A flywheel apparatus for an internal combustion engine where said engine comprises a crankshaft, a cam shaft, a means of advancing said crankshaft in rotation on the power strokes to that of said flywheel, means of retarding said crankshaft on the compression strokes said flywheel, said apparatus further comprising, a first flywheel, linkage means connecting a flywheel shaft to said crankshaft, a first flywheel housing, bearing means of linking said first flywheel to said flywheel shaft, a plurality of cylinders housed to said first flywheel housing, a plurality of nitrogen charged bladders housed within said cylinders, a plurality of cam action rods housed within said cylinders, a cam housed to said flywheel shaft, linkage means linking said cam action rods to said bladders, second linkage means linking said cam action rods by way of a cam roller to said cam, a freewheeling flywheel housing, bearing means linking said freewheeling flywheel to said flywheel shaft, third linkage means linking a freewheeling clutch between said freewheeling flywheel housing and said flywheel shaft, a shifter apparatus comprising means of locking said first flywheel housing to said freewheeling flywheel housing in a first position, means of connecting said flywheel shaft and said freewheeling flywheel housing by way of said freewheeling clutch in a second position, a front flywheel comprising means of driving said cam shaft at a balanced rotational speed from said crankshaft when said crankshaft is rotating at varying rotational speeds within each revolution of said crankshaft.

2. An apparatus as claimed in claim 1 comprising bearing means between said shaft and said first flywheel housing, second bearing means between said shaft and said freewheeling flywheel housing, a splined segment, a freewheeling clutch movable to engage with said splined segment, a threaded segment, a nut threaded to said threaded segment for the purpose of holding said first flywheel housing to said flywheel shaft and a second threaded segment with a nut threaded to said segment for the purpose of holding said freewheeling flywheel housing to said flywheel shaft.

3. An apparatus as claimed in claim 2 comprising; a flywheel housing, bearing means between said housing and said flywheel shaft, a splined segment, a freewheeling clutch with said clutch moveable on said splined segment, a plurality of cylinders perpendicular to said flywheel shaft housed to said flywheel housing, a plurality of nitrogen charged bladders housed within said cylinders, a plurality of cam action rods linked to said bladders, first oil seal means between said flywheel housing and said flywheel shaft and second oil seal means between said flywheel housing and said freewheeling flywheel housing.

4. An apparatus as claimed in claim 3 further including; said freewheeling flywheel housing including an internally splined segment, said freewheeling clutch moveable on said splined segment, means of housing a plurality of shifters rods movable through said housing, third linkage means for a shifter rod housing and bearing means between said freewheeling flywheel housing and said flywheel shaft.

5. An apparatus as claimed in claim 4 including said freewheeling clutch, with said clutch further comprising an inner segment, which is internally spined, an outer segment which is externally splined, a shifter ring, linkage means for linking a plurality of shifter rods with said shifter ring, a plurality of clutch bearings between said inner segment and outer segment and that said freewheeling clutch is moveable by way of said shifter ring on said external splines.

6. An apparatus as claimed in claim 5 further includes a shifter apparatus, said shifter apparatus further comprising an internal shifter ring, an external shifter ring, a plurality of shifter rods, wherein one end of said shifter rods are threaded to link with said internal shifter ring and the opposite end of said rods are linked with said external shifter ring, wherein said shifter rods are housed and moveable through said freewheeling flywheel housing, a shifter rod housing with said shifter rods moveable through said shifter rod housing, said shifter rod housing further comprises a drive coupling, said external shifter ring is moveable on said drive coupling by moving said shifter rings forward until said freewheeling clutch engages with said flywheel internal splines and that by moving said shifter rings to the rear position said freewheeling cluctch engages with said flywheel shaft splines and disengage with said flywheel splines.

7. An apparatus as claimed in claim 6 further including a bell housing, said bell housing further comprising a housing, a plurality of shifter operating rods with said operating rods linked at one end to a shifter ring, linkage means linking said rods to said housing, a plurality of electric solenoids, second linkage means linking said solenoids with said operating rods, a drive shaft with said drive shaft housed by way of a ball bearing to said bell housing and said electric solenoids comprising the means of operation of said operation rods.

8. An apparatus as claimed in claim 7 includes a plurality of cam action rods, said cam action rods further comprises, a rod, said rod comprises an inner lineal ball bearing race, a cam roller, a cam roller pin, a cam roller bearing, an outer housing, said outer housing comprises an outer lineal bearing race, a plurality of ball bearings held between said inner race and said outer race and that said cam action rods are housed within said cylinders of said flywheel housing.

9. An apparatus as claimed in claim 8 includes a plurality of nitrogen pressurized bladders, said bladders further comprises linkage means linking said bladders with said cam action rods at one end, said linkage means linking said bladders having an opposite end with a threaded cap and said bladders are housed within said flywheel housing.

10. An apparatus as claimed in claim 1 includes a means for driving the cam shaft of an internal combustion engine at a balanced rotational speed when the crankshaft is forced to operate at variable speed, within each revolution comprising in combination; a front flywheel, said front flywheel further comprises, a flywheel housing and a double ball bearing, said front flywheel is housed to said crankshaft by way of said ball bearing, a rear cam plate, said rear cam plate is moveable on a lineal ball bearing, a nitrogen pressurized bladder, linkage means between said bladder and said front cam plate, a flywheel drive housing, said bladder is housed within said drive housing and further comprises means of keying said housing to said crankshaft, a plurality of ball bearings between said rear cam plate and said front cam plate so that when said drive housing is rapidly rotated, said ball bearing between said cam plate will force said front cam plate against said bladder to advance said crankshaft forward to that of said flywheel housing, and so that when the force to rotate said crankshaft is removed, said bladder will rapidly force said cam plates to their neutral position and that said cam shaft is driven from said flywheel housing.

11. An apparatus as claimed in claim 1 includes an internal combustion engine crankshaft, said crankshaft further comprises a means of timing the pistons of said engine whereby all pistons are parallel with each other in a 4 cylinder engine with all the pistons parallel within each bank in a V-type engine, said crankshaft is further comprised of a titaninum alloy and an linkage means for said flywheel.

12. An apparatus as claimed in claim 1 includes an internal combustion engine cam shaft, said cam shaft further comprises a means of timing the valves of said engine whereby no less than two pistons of said engine are on the power strokes at the same time for the purpose of providing the desirable spacing between each of the power strokes of said engine when said engine is equiped with said flywheel.

13. A flywheel; said flywheel comprising in combination; a flywheel shaft, a double ball bearing housed around said shaft, a flywheel housed to said ball bearing, a cam, a plurality of cam action rods, a plurality of nitrogen charged bladders, a plurality of cylinders; said cylinders housed to said flywheel, said bladders and said cam action rods are housed within said cylinders, a freewheeling flywheel, said freewheeling flywheel is housed to a double ball bearing, said bearing is housed to said flywheel shaft, a freewheeling clutch, a shifter apparatus, a shifter ring, a plurality of shifter rods, said shifter rods are housed to said frewheeling flywheel, a shifter rod housing, said housing is housed to said freewheeling flywheel housing, said shifter rods further pass through said shifter rod housing, a second shifter ring, said shifter rods comprise linkage means between said first shifter ring and said second shifter ring, a plurality of shifter operating rods, a bell housing, said operating rods are housed to said bell housing, a plurality of electric solenoids, linkage means between said solenoids and said operating rods, said solenoids are housed to said bell housing, a drive shaft, said drive shaft is housed and driven by said shifter ring housing, a ball bearing, said bearing is housed around said drive shaft, said bearing is further housed within said bell housing and said combination comprises a means of allowing a crankshaft of the internal combustion engine to be advanced in rotation to that of said flywheel on the power strokes; means of allowing the crankshaft to be retarded to that of said flywheel on the compression strokes of said engine and, and said combination comprises a means of driving an automobile from said engine flywheel when said flywheel is housed to the internal combustion engine crankshaft.

14. A flywheel apparatus that comprises means of driving an object at a constant rotatable speed from an internal combustion engine crankshaft with said crankshaft being driven at varying speeds within each revolution of said crankshaft comprising; a flywheel housing, bearing means linking said crankshaft with said flywheel housing, a camplate, linkage means keying said camplate to said flywheel housing, a second camplate, a plurality of tapered ball bearing grooves machined to the face of each of said camplates, bearing means between said camplates, lineal bearing grooves machined to the outer diameter of said second camplate forming an inner lineal bearing race, bearing means between said inner lineal bearing race and an outer lineal bearing race, a drive housing, that said outer lineal bearing is doweled to said drive housing, linkage means keying said drive housing to said crankshaft, a nitrogen pressurized bladder, that said drive housing comprises housing for said bladder, that said second camplate is moveable on said lineal bearing against said bladder, that said lineal bearing further comprises means of locking said second camplate in rotation with said drive housing, that by rapid rotational motion from said crankshaft said bearing means between said camplates lineally will force said second camplate against said bladder to advance said drive housing forward of said flywheel housing, so that when the force to rotate said drive housing is removed, said pressurized bladder will force said camplates to their natural position causing a balanced rotational speed to said flywheel housing when said drive housing is driven from said crankshaft at varying speeds throughout each revolution of said crankshaft and, that said object is driven from said flywheel housing.

15. A flywheel apparatus that comprises the means of more rapidly converting the heat produced from combustion to rotatable energy at low revolution per minute of an internal combustion engine that is equal to the power produced from a conventional engine at a much higher revolution per minute comprising in combination, an engine crankshaft, said crankshaft casted from titanium metal for the purpose of lightening said crankshaft, a flywheel shaft connected to said crankshaft, a first flywheel connected to said flywheel shaft, said first flywheel further comprises means of allowing said crankshaft to be advanced forward to that of said first flywheel on the power strokes of the internal combustion engine, means of rapid retarding said crankshaft to said first flywheel on the compression strokes of said engine, a freewheeling flywheel, said freewheeling flywheel is connected to said first flywheel shaft, said freewheeling flywheel comnprises means of rotating at the highest rotational speed of said crankshaft, said freewheeling flywheel further comprises means of freewheeling when said crankshaft is slowed in motion by said first flywheel; a shifter apparatus; said shifter apparatus further comprises means locking said freewheeling flywheel to said first flywhel in one position and further comprising, and means of locking said freewheeling flywheel to said first flywheel shaft in the second position.

* * * * *